United States Patent [19]

Wasson et al.

[11] 3,920,691

[45] Nov. 18, 1975

[54] 5-(3-SUBSTITUTED AMINO-2-HYDROXYPROPOXY)-1,3-DISUBSTITUTED PYRAZOLES AND METHOD OF PREPARATION

[75] Inventors: Burton Kendall Wasson, Valois; Clarence Stanley Rooney, Beaconsfield, both of Canada

[73] Assignee: Merck Sharp & Dohme (I.A.), Rahway, N.J.

[22] Filed: Nov. 6, 1974

[21] Appl. No.: 521,416

Related U.S. Application Data

[63] Continuation of Ser. No. 341,446, March 15, 1973, abandoned.

[30] Foreign Application Priority Data

May 5, 1972 Canada .................................. 141470

[52] U.S. Cl. .............................. 260/310 R; 424/273
[51] Int. Cl.² ........................................ C07D 231/20
[58] Field of Search ................................ 260/310 R

[56] References Cited
UNITED STATES PATENTS

3,629,433  12/1971  Gschwend ....................... 260/310 R
3,637,738  1/1972  Gschwend ....................... 260/310 R
3,651,086  3/1972  Pachter ........................... 260/310 R
3,726,896  4/1973  Amato et al. .................... 260/310 C

OTHER PUBLICATIONS

Crowther et al., Chemical Abstracts, Vol. 76:148741g (1972).

Petrow et al., Chemical Abstracts Vol. 51, Columns 2662–2663, (1957).

Sandoz, Chemical Abstracts, Vol. 66:18669x (1967).

Shapiro et al., Chemical Abstracts, Vol. 58, Column 1476, (1963).

*Primary Examiner*—Donald B. Moyer
*Attorney, Agent, or Firm*—Daniel T. Szura; J. Jerome Behan

[57] ABSTRACT

5-(3-Substituted amino-2-hydroxypropoxy)-1,3-disubstituted pyrazoles possessing β-adrenergic blocking properties are described. Products are prepared by reaction of the 1,3-disubstituted-1,2-pyrazol-5-one with an epihalohydrin and the epoxide formed reacted with the appropriate substituted amine.

4 Claims, No Drawings

5-(3-SUBSTITUTED AMINO-2-HYDROXYPROPOXY)-1,3-DISUBSTITUTED PYRAZOLES AND METHOD OF PREPARATION

This is a cont. of application Serial No. 341,446 filed March 15, 1973 now abandoned.

This invention is concerned with 5-(3-substituted amino-2-hydroxypropoxy)-1,3-disubstituted pyrazole compounds which exhibit β-adrenergic blocking properties.

The novel pyrazole compounds of this invention have the structure

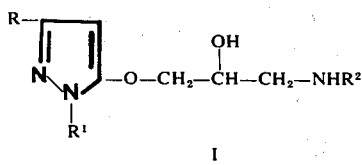

I and pharmacologically acceptable salts thereof wherein R represents hydrogen, $C_{1-3}$ alkyl, $C_{1-3}$ alkoxy, phenyl or benzyl; $R^1$ represents $C_{3-6}$-cycloalkyl, phenyl-$C_{1-3}$ alkyl, phenyl, substituted phenyl wherein the substituent(s) is (are) similar or dissimilar selected from halo (especially chloro, bromo, fluoro), $C_{1-3}$ alkyl, $C_{1-3}$ alkoxy; and $R^2$ represents a straight or branched chain $C_{3-6}$ alkyl, a straight or branched chain hydroxy substituted $C_{3-6}$ alkyl, or a straight or branched chain $C_{3-6}$ alkinyl group, phenyl-$C_{1-6}$ alkyl and indolyl-$C_{1-6}$ alkyl.

Suitable pharmacologically acceptable salts of product I are acid addition salts derived from inorganic acids for example hydrochlorides, hydrobromides, phosphates, or sulfates or salts derived from organic acids, for example, oxalates, lactates, malates, maleates, formates, acetates, succinates, tartrates, salicylates, citrates, phenylacetates, benzoates, p-toluenesulfonates and other salts such as those that provide relatively insoluble products that afford a slow release of the active material, for example, a 1,1'-methylenebis(2-hydroxy-3-naphthoate) and the like.

The novel compounds, I, as well as their intermediates which contain one asymmetric carbon atom in the propylene chain will be obtained as a racemic mixture which can be separated into optically active isomers by known methods, for example, by forming a salt with an optically active acid, many of which are known to those skilled in the art, such as optically active tartaric, mandelic, cholic, O,O-di-p-toluoyl tartaric, O,O-di-benzoyl tartaric acids or other acids conventionally employed for this purpose.

The potential of a product as a β-adrenergic blocking agent conventionally is evaluated by the protocol which was employed to assess the β-blocking properties of the novel compounds of this invention. The protocol employed comprises intravenous administration of graded doses of the selected compound to rats which then are challenged with a standard dose of isoproterenol, a product known to be a β-stimulant.

The clinical application of β-adrenergic blocking agents is well known to physicians. Uses for the novel compounds of this invention include treatment of angina pectoris, catecholamine induced cardiac arrhythmias and hypertension as well as for the control of tachycardia that may be drug induced (as by isoproterenol) or brought about by physiological conditions. In view of the considerable amount of literature that has accumulated concerning the use of β-adrenergic blocking agents, physicians would employ the products of this invention in any of the known conditions where a β-blocker is needed, such as in the management of angina pectoris.

The products can be prepared in pharmaceutical formulations suitable for oral or parenteral administration preferably in the form of tablets, solutions, suspensions, or emulsions using well known techniques and excipients, diluents, lubricants, and the like. Dosage units of from about 1 mg. to about 40 mgs. can be provided for the symptomatic adjustment of dosage by the physician depending upon the age and condition of the patient.

The novel pyrazole products, I, of this invention advantageously can be prepared by the synthesis schematically illustrated below:

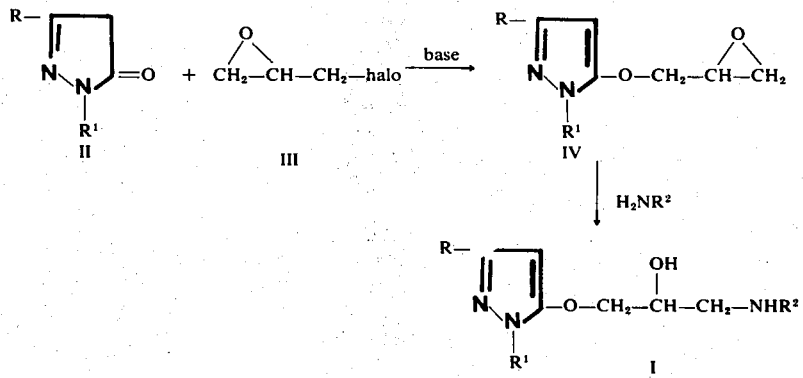

The 1,3-disubstituted-1,2-pyrazolin-5-one (II) is treated with epichlorhydrin or epibromhydrin (III) to give the epoxide (IV). The reaction is facilitated by the presence of a trace of base which serves as a catalyst, preferably piperidine, piperidine hydrochloride, pyridine, or other heterocyclic N-containing bases followed by shaking the crude product with aqueous alkali metal hydroxide. Ideally the epihalohydrin is used in excess for its solvent properties and the reaction proceeds at room temperature or with heating up to about 125° C. Treatment of the epoxide (IV) with the amine, $H_2NR^2$, provides the desired pyrazole product I. Advantageously an excess of the amine is employed for its solvent properties, from 3 to 5 moles of the amine being adequate to give very good yields of the desired product. This step can be carried out at a temperature between about ambient temperature and reflux although it is preferred to use some heating of the reaction mixture.

The following examples will illustrate representative products of this invention prepared by the above described procedure. The following examples however are not to be considered as limiting the preparation of any particular compound to the method described in the examples which are provided solely to illustrate the best mode currently known to applicants for the preparation of the novel pyrazole products of this invention.

EXAMPLE 1

5-(3-tert-butylamino-2-hydroxypropoxy)-3-methyl-1-phenylpyrazole dihydrochloride methanolate A mixture of 3-methyl-1-phenyl-1,2-pyrazolin-5-one (5.22 g., 30 mmoles), epichlorhydrin (16.6 g., 180 mmoles) and two drops of piperidine are warmed at 110° C. for 1.5 hours. The mixture was evaporated in vacuo, dissolved in benzene and again evaporated to dryness. The resulting oily product is shaken one-half hour with sodium hydroxide solution (45 ml., 33%). The mixture is extracted with chloroform, the chloroform extracts washed with water and evaporated to dryness. The residue is dissolved in chloroform and chromatographed on silica gel to afford 5-(2,3-epoxypropoxy)-3-methyl-1-phenylpyrazole (2.6 g.). The crude epoxide is refluxed overnight with tert-butylamine (12 ml.) and evaporated to dryness. The residue is dissolved in benzene, extracted with 2N HCl and the aqueous acid solution evaporated to dryness. The residue is crystallized several times from a mixture of methanol and ethyl acetate to give 1.98 g. of 5-(3-tert-butylamino-2-hydroxypropoxy)-3-methyl-1-phenylpyrazole dihydrochloride methanolate, m.p. 195°–197.5° C.

Analysis calculated for $C_{17}H_{25}O_2N_3 \cdot 2HCl \cdot CH_3OH$: N, 10.29; Cl, 17.38.

Found: N, 9.82; Cl, 17.07.

EXAMPLE 2

5-(3-Isopropylamino-2-hydroxypropoxy)-3-ethyl-1-phenylpyrazole

By replacing the 3-methyl-1-phenyl-1,2-pyrazolin-5-one and the tert-butylamine employed in Example 1 by equivalent quantities of 3-ethyl-1-phenyl-1,2-pyrazolin-5-one and isopropylamine, respectively, and following substantially the same procedure described in Example 1 there is obtained 5-(3-isopropylamino-2-hydroxypropoxy)-3-ethyl-1-phenylpyrazole.

EXAMPLE 3

5-(3-Isopropylamino-2-hydroxypropoxy)-3-ethoxy-1-phenylpyrazole

By replacing the 3-methyl-1-phenyl-1,2-pyrazolin-5-one and the tert-butylamine employed in Example 1 by equivalent quantities of 3-ethoxy-1-phenyl-1,2-pyrazolin-5-one and isopropylamine, respectively, and following substantially the same procedure described in Example 1 there is obtained 5-(3-isopropylamino-2-hydroxypropoxy)-3-ethoxy-1-phenylpyrazole.

EXAMPLE 4

5-[3-(2,2-Dimethylpropylamino)-2-hydroxypropoxy]-3-ethoxy-1-phenylpyrazole

By replacing the 3-methyl-1-phenyl-1,2-pyrazolin-5-one and the tert-butylamine employed in Example 1 by equivalent quantities of 3-ethoxy-1-phenyl-1,2-pyrazolin-5-one and 2,2-dimethylpropylamine, respectively, and following substantially the same procedure described in Example 1 there is obtained 5-[3-(2,2-dimethylpropylamino)-2-hydroxypropoxy]-3-ethoxy-1-phenylpyrazole.

EXAMPLE 5

5-[3-(1,1-dimethylpropargylamino)-2-hydroxypropoxy]-3-ethoxy-1-phenylpyrazole

By replacing the 3-methyl-1-phenyl-1,2-pyrazolin-5-one and the tert-butylamine employed in Example 1 by equivalent quantities of 3-ethoxy-1-phenyl-1,2-pyrazolin-5-one and 1,1-dimethylpropargylamine, respectively, and following substantially the same procedure described in Example 1 there is obtained 5-[3-(1,1-dimethylpropargylamino)-2-hydroxypropoxy]-3-ethoxy-1-phenylpyrazole.

EXAMPLE 6

5-[3-(1,1-dimethyl-2-hydroxyethylamino)-2-hydroxypropoxy]-3-ethyl-1-phenylpyrazole By replacing the 3-methyl-1-phenyl-1,2-pyrazolin-5-one and the tert-butylamine employed in Example 1 by equivalent quantities of 3-ethyl-1-phenyl-1,2-pyrazolin-5-one and 1,1-dimethyl-2-hydroxyethylamine, respectively, and following substantially the same procedure described in Example 1 there is obtained 5-[3-(1,1-dimethyl-2-hydroxyethylamino)-2-hydroxypropoxy]-3-ethyl-1-phenylpyrazole.

EXAMPLE 7

5-(3-tert-butylamino-2-hydroxypropoxy)-3-benzyl-1-phenylpyrazole

Following the procedure described in Example 1 with the exception that 3-methyl-1-phenyl-1,2-pyrazolin-5-one is replaced by an equivalent quantity of 3-benzyl-1-phenyl-1,2-pyrazolin-5-one there is obtained 5-(3-tert-butylamino-2-hydroxypropoxy)-3-benzyl-1-phenylpyrazole.

The products identified in the following table are made by substantially the same method identified in Example 1 employing the reactants identified.

TABLE I

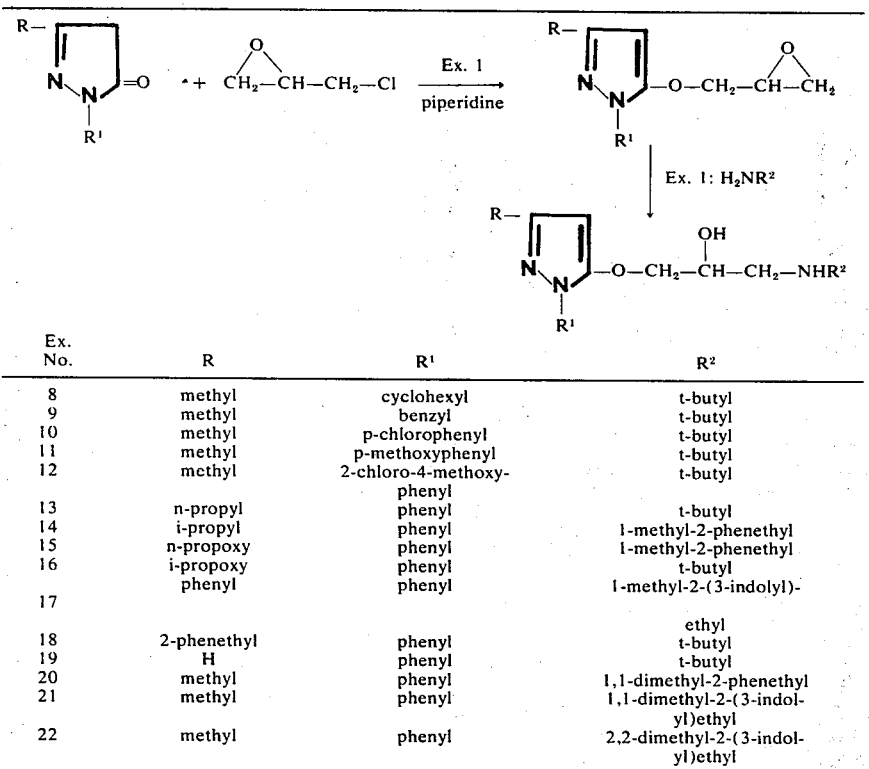

| Ex. No. | R | R¹ | R² |
|---|---|---|---|
| 8 | methyl | cyclohexyl | t-butyl |
| 9 | methyl | benzyl | t-butyl |
| 10 | methyl | p-chlorophenyl | t-butyl |
| 11 | methyl | p-methoxyphenyl | t-butyl |
| 12 | methyl | 2-chloro-4-methoxy-phenyl | t-butyl |
| 13 | n-propyl | phenyl | t-butyl |
| 14 | i-propyl | phenyl | 1-methyl-2-phenethyl |
| 15 | n-propoxy | phenyl | 1-methyl-2-phenethyl |
| 16 | i-propoxy | phenyl | t-butyl |
| 17 | phenyl | phenyl | 1-methyl-2-(3-indolyl)-ethyl |
| 18 | 2-phenethyl | phenyl | t-butyl |
| 19 | H | phenyl | t-butyl |
| 20 | methyl | phenyl | 1,1-dimethyl-2-phenethyl |
| 21 | methyl | phenyl | 1,1-dimethyl-2-(3-indolyl)ethyl |
| 22 | methyl | phenyl | 2,2-dimethyl-2-(3-indolyl)ethyl |

We claim:

1. A compound of the formula

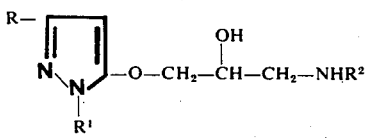

I and pharmacologically acceptable salts thereof wherein R is selected from the group consisting of hydrogen, alkyl of from 1 to 3 carbon atoms, alkoxy of from 1 to 3 carbon atoms, phenyl and benzyl; R¹ is selected from the group consisting of cycloalkyl of from 3 to 6 carbon atoms, phenyl-alkyl wherein the alkyl moiety is from 1 to 3 carbon atoms, phenyl, mono- or di-substituted phenyl wherein the substituent is chloro, alkyl of from 1 to 3 carbon atoms, alkoxy of from 1 to 3 carbon atoms, or mixtures thereof; and R² is selected from the group consisting of a straight or branched chain alkyl of from 3 to 6 carbon atoms, a straight or branched chain hydroxy substituted alkyl of from 3 to 6 carbon atoms, a straight or branched chain alkinyl of from 3 to 6 carbon atoms, phenyl-alkyl the alkyl moiety of from 1 to 6 carbon atoms, and (3-indolyl)-alkyl wherein the alkyl moiety is from 1 to 6 carbon atoms.

2. A compound of claim 1 wherein R is alkyl of from 1 to 3 carbon atoms and R² is straight or branched chain alkyl of from 3 to 6 carbon atoms.

3. A compound of claim 2 wherein R¹ is phenyl.

4. 5-(3-tert-butylamino-2-hydroxypropoxy)-3-methyl-1-phenylpyrazole.

* * * * *